1,489,917

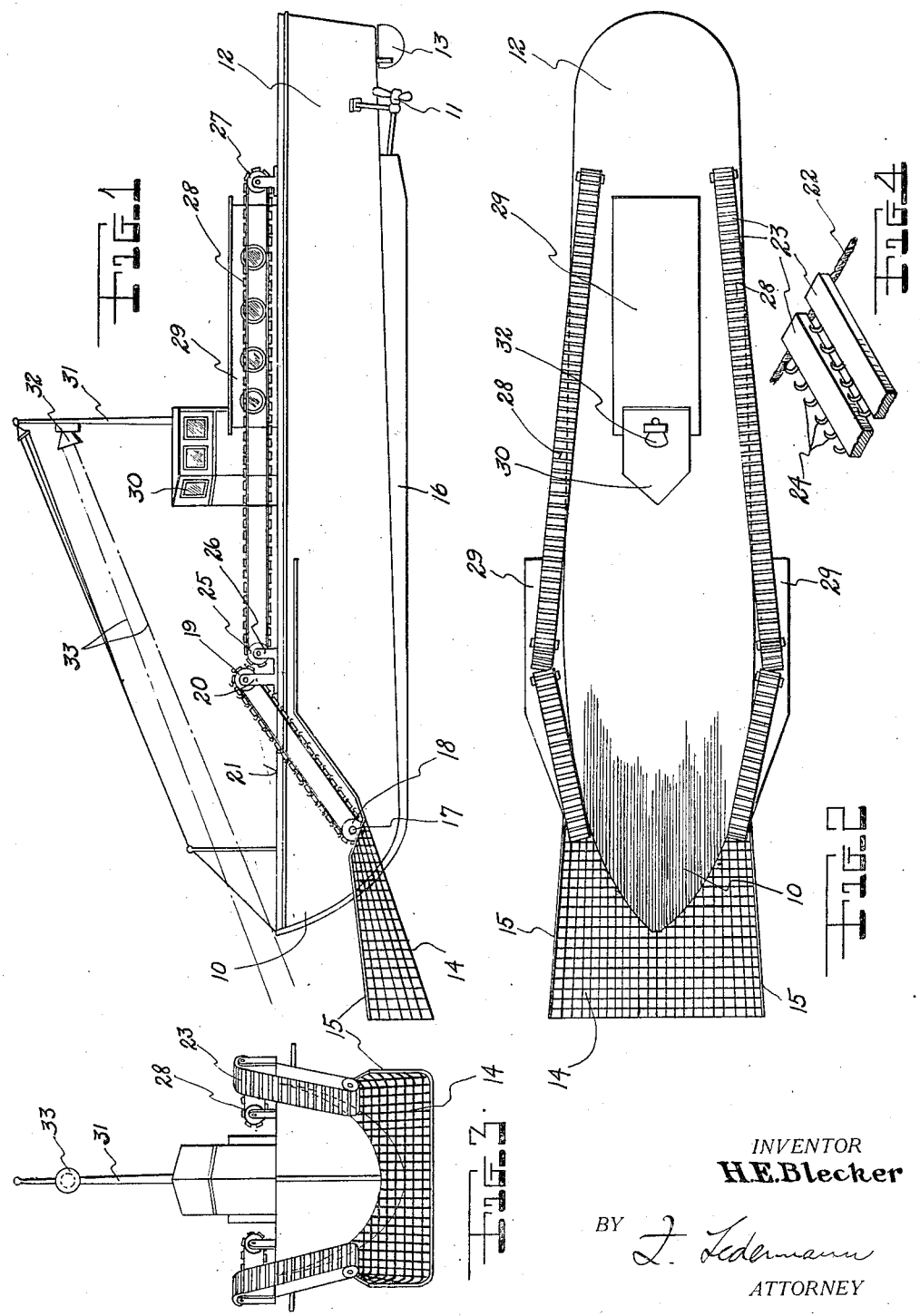
April 8, 1924.
H. E. BLECKER
OCEAN HARVESTER
Filed Feb. 12, 1923
1,489,917
INVENTOR
H.E.Blecker
BY
ATTORNEY Patented Apr. 8, 1924.

UNITED STATES PATENT OFFICE.

HERBERT E. BLECKER, OF NEW YORK, N. Y.

OCEAN HARVESTER.

Application filed February 12, 1923. Serial No. 618,442.

*To all whom it may concern:*

Be it known that I, HERBERT E. BLECKER, a citizen of the United States, residing at New York, in the county of New York and State of New York, have invented certain new and useful Improvements in Ocean Harvesters, of which the following is a specification.

This invention relates to fishing apparatus, and the main object is to provide a device which may be attached to the bow of a ship for the purpose of scooping fish from the sea into a net from which they are directly delivered to the deck of the vessel.

Another object is to provide a scoop net and a series of conveyors which will remove the trapped fish from the net and deliver them to the deck of the ship preparatory to packing or other purposes.

These and other objects will become apparent in the description below, in which characters of reference refer to like-named parts in the drawing.

Referring briefly to the drawing, Figure 1 is a side elevational view of a ship showing the device mounted in place thereon.

Figure 2 is a top plan view of the same.

Figure 3 is a front elevational view of Figure 1, looking at the bow of the ship.

Figure 4 is a fragmentary perspective view of a section of the conveyor belt.

Referring more in detail to the drawing, the numeral 10 indicates the bow of a motor trawler which is driven by a set of propellers 11 located beneath the stern 12 and directly in front of the rudder 13. The type of trawler shown on the drawing is in general use in the fishing industry, but the device attached thereto is not limited to this type of craft, as it has been so designed as to be easily installed and used on any of the other type of fishing craft. A scoop net is provided, composed of a flat bottom 14, the ends of which are bent up to form walls 15. This net can be made of rope or wire or any other material suitable for the purpose, and it extends forward from the lower end of the bow 10 of the boat and dips angularly to a position below the keel of the vessel. The net is rigidly fixed to the side surfaces of the bow by any desirable means. Shafts 17 extend from the interior of the vessel outwardly in the region where the net is attached to the bow, and have driving sheave wheels 18 fixed to their external ends. Similar sheaves 19 are rotatably mounted between bearings 20 upon the deck 21 of the vessel. The sheave wheels 18 and 19 are connected by a pair of endless ropes 22 upon which transverse slots 23 are secured. The rear edges (with respect to the travel of the conveyor) of the slats have a plurality of open hook members 24 projecting therefrom which are adapted to come in contact with the body of the fish in the net, and seat them on the upper surface of the slat which carries them angularly upward to the deck 21. Sheave wheels 25 which are similarly arranged between brackets 26, are mounted on the deck adjacent to the sheave wheels 19 and are connected to rear sheave wheels 27 by endless conveyors 28 which are of the same construction as the one previously mentioned but are not provided with the grip hooks 24, these being unnecessary, as the line of travel of the conveyor belt is horizontal.

From Figure 2 it will be noted that the angular conveyors at the bow end of the boat are mounted adjacent to and outside of the gunwale. In order to prevent the fish from again falling into the water after having been brought to the top of the incline on the conveyors, platforms 29$^a$ are built upon the sides of the boat and beneath the adjacent ends of both sets of conveyors. The forward ends of the delivery conveyors 28 meet the incline conveyors and extend angularly aft to a point behind the super structure 29. The pilot house 30 built on the deck 21 forward of the super structure 29 has a mast 31 extending upwardly therefrom, upon which a relatively powerful flood or search light 32 is mounted for night fishing. The light is mounted at the upper end of the mast so as to throw its rays angularly downward and directly in front of the ship, the rays being indicated on the drawing by the broken lines 33.

In use, this craft is propelled by members 11 in the usual way and is steered into schools of fish head on. The net 14 at the bow end of the boat will receive the wash of the sea and with it any fish which may be found in that area. The inclined conveyors at the bow end of the boat are rotating during this interval, and the hooks 24, in riding the peripheries of the lower wheels 18, will be turned into such position as to expose the points of said hooks to the bodies of the fish and hook into the same. The conveyors will carry the fish captured to the deck 21 where the fish will be discharged from the inclined conveyors 28 and delivered to the stern of the ship where they can be collected in a suitable container, not shown.

The search light 32 located at the upper end of the mast 31 is used for night operations only and serves as a bait for luring the fish into the vicinity of the net 14 by illuminating the body of water directly in front of the bow, it being obvious to those skilled in the art that a light of this type attracts the fish.

I claim:—

1. In combination with a ship, an angular net projecting from the bow of the ship, said net being secured alongside the forward gunwales of the ship, the entering edge of said net being below the keel of the ship, a set of conveyors mounted outside the forward gunwale of the ship extending angularly upward from the net to the deck of the ship, said conveyors being adapted to remove the fish from the net and carry the same to the deck, a flood or searchlight mounted on the ship and adapted to illuminate the body of water in front of the net, and means for retaining the fish in place on the angular conveyors.

2. In combination with a ship, an angular net projecting forward from the bow of the ship, the entering edge of said net being below the keel of the ship, a set of angular belt driven conveyors mounted outside the forward gunwales of the ship, the lower ends of said conveyors dipping into the the rear portion of the net, the upper ends of said conveyors being above the deck, a set of horizontal belt driven conveyors meeting and cooperating with the angular conveyors, and platforms secured to the forward gunwales meeting the net at one end and lying under the cooperating ends of the sets of conveyors, said platforms being adapted to catch the fish which fall from the conveyors.

In testimony whereof I affix my signature.

HERBERT E. BLECKER.